Nov. 9, 1926.
J. E. HUGHES ET AL
1,606,300
HITCH FOR SEMITRAILERS
Filed April 28, 1923    3 Sheets-Sheet 3
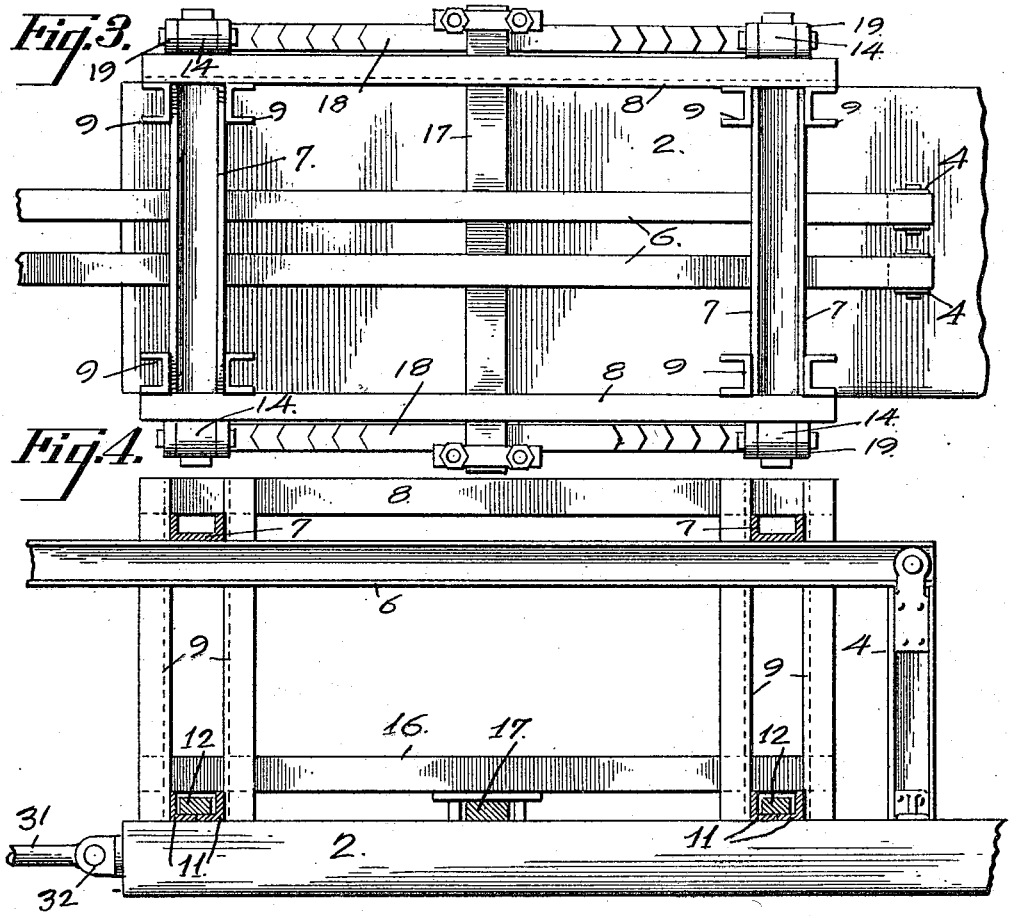
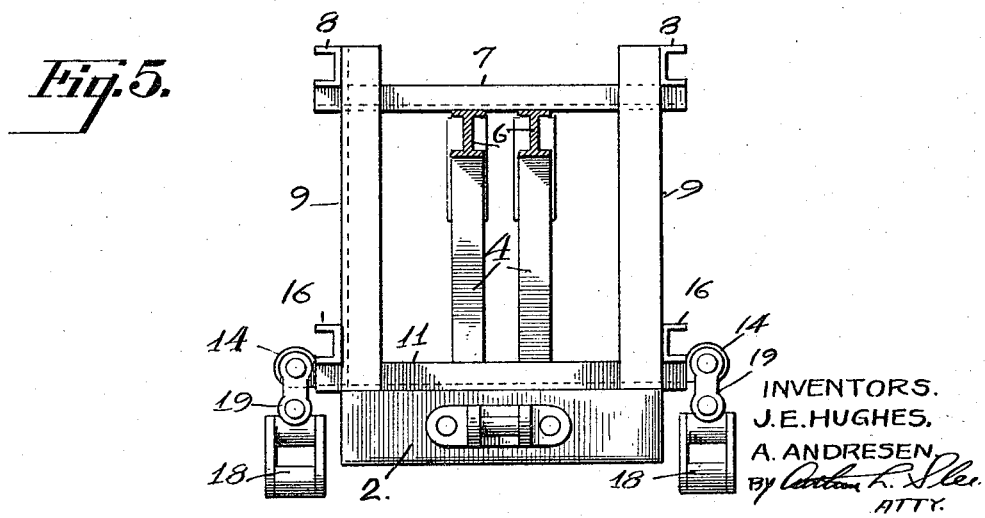
INVENTORS.
J. E. HUGHES.
A. ANDRESEN
ATTY.

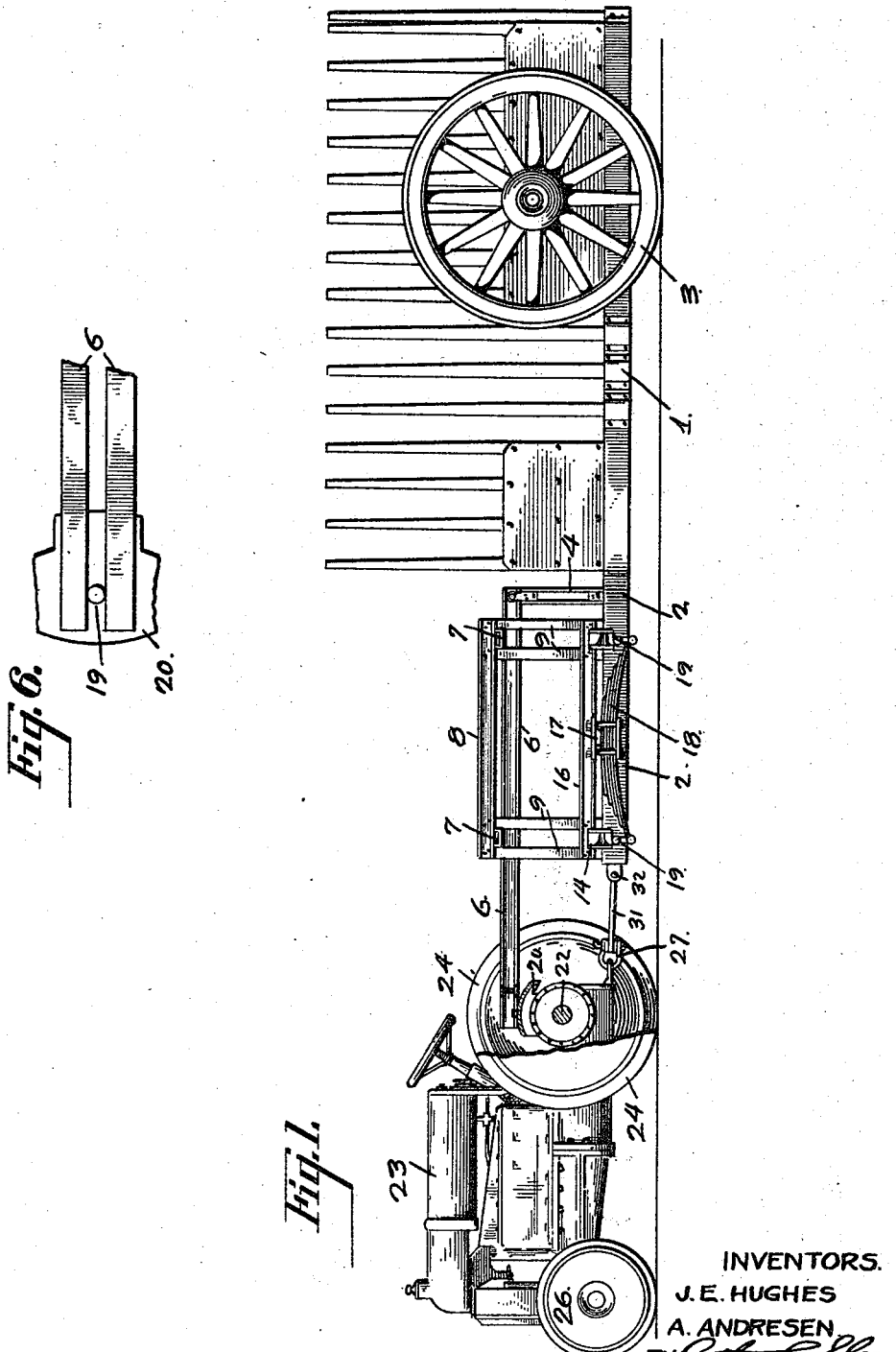

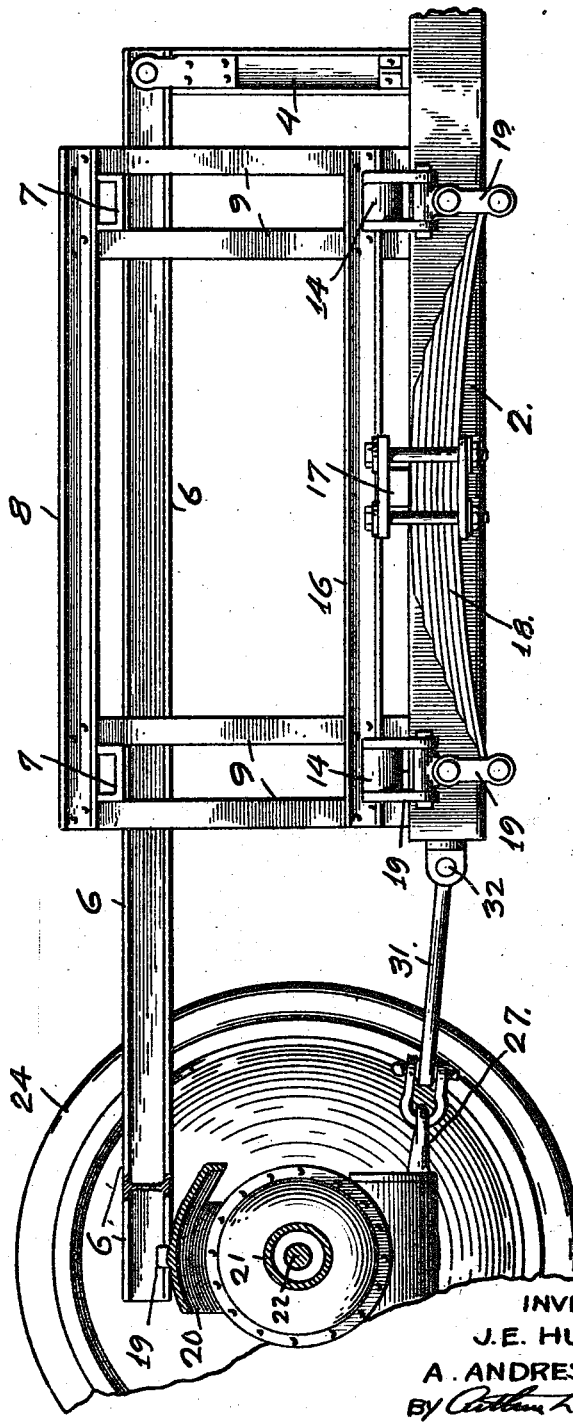

Patented Nov. 9, 1926.

1,606,300

UNITED STATES PATENT OFFICE.

JOHN E. HUGHES AND ANDREAS ANDRESEN, OF SAN FRANCISCO, CALIFORNIA.

HITCH FOR SEMITRAILERS.

Application filed April 28, 1923. Serial No. 635,388.

Our invention relates to trailer supports wherein a supporting bar pivotally mounted upon the forward end of a trailer operates in conjunction with resilient means for resiliently supporting the load of the trailer at a point directly over the rear axle of a towing tractor, and also in conjunction with a draw-bar for draft connection from said trailer to a point below the center of the rear axle of a towing tractor to facilitate retention of the front wheels of said tractor on said ground.

Before the advent of tractor-trailer hauling a certain type of low bed truck was very widely used for heavy trucking and proved advantageous for the reason that heavy objects were not required to be lifted any considerable distance to load them onto said truck.
After the advent of truck hauling an enormous investment of capital, as represented by these trucks, was practically lost for the reason that most tractor-trailers were constructed with a high bed in order to be readily attached, after the front wheels had been removed, to the rear end of a motor vehicle or truck, or a suitable tractor.

A certain tractor of the Fordson type now being available for truck hauling, it is desired to utilize the low bed trucks for trailers, but heretofore this has not been practicable for the reason that the hauling clevis of said type of tractor is located below the rear axle housing and when low bed trucks are directly connected by means of a suitable support and coupling to the low located clevis the weight of the load has a tendency to elevate the front wheels of the tractor, and to overcome this serious defect, the front wheels of the tractor were heavily loaded to offset the action of the trailer in lifting said front wheels of said tractor from the ground.

In order to utilize the low bed trucks with a tractor of the Fordson type of tractor we have devised a trailer support for low bed trucks which is adapted to resiliently support the load of said trailer by resting upon the tractor at a point directly above the rear axle of the four wheeled tractor and thereby not only facilitate traction or tractive effort but also eliminate the tendency of the load of the trailer to lift the front wheels of said tractor.
To further prevent the lifting of the said front wheels from the ground the draw bar of the trailer is attached to the usual hauling clevis located below the rear axle of said tractor thereby changing the direction of the force which formerly lifted the front wheels of said tractor from the ground and applying said force in a direction which would tend to keep said front wheels upon the ground, thereby eliminating the dead weight which was formerly required to accomplish this result.

Therefore the primary object of the present invention is to provide a new and improved trailer support adapted to resiliently support a trailer load in such a manner that the said load will tend to facilitate traction and to retain the front wheels of a Fordson type of tractor upon the ground without the provision of additional weight attached to said front wheels. Also to provide a draw-bar attached to a point below the rear axle of the tractor whereby horizontal draft of the trailer will tend to retain the front wheels of the tractor on the ground.

We accomplish these and other objects by means of the device disclosed in the drawings forming a part of the present specification wherein like characters of reference are used to designate similar parts throughout the said specification and drawings, and in which—

Fig. 1 is a broken side elevation of our improved trailer support disclosing the application of the same to a low bed truck and to a four wheeled tractor of the Fordson type.

Fig. 2 is an enlarged broken side elevation of the support disclosing a portion of the truck and the tractor.

Fig. 3 is a plan view of Fig. 2.

Fig. 4 is a longitudinal sectional view of Fig. 3.

Fig. 5 is a vertical sectional view of the support; and

Fig. 6 is an enlarged broken plan view of the tractor or front end of the support, disclosing the manner in which the support engages the guiding or steering lug on the tractor.

Referring to the drawings the numeral 1 is used to designate in general a trailer of the low bed type having the rigid tongue extension 2 on the front end thereof. Formerly, these trucks were built with the said tongue extension universally suspended by means of suitable rings from the front axle which is not illustrated in the present case being no portion of the present invention.

The rear end of the low bed truck 1 is supported by means of the usual rear wheels 3 while the front portion of said truck 1 is supported by the supporting mechanism and the tractor in the following manner:

Near the rear end of the front tongue extension 2 we have provided upright or vertically disposed members 4 to the upper ends of which we have pivotally or hingedly connected the rear ends of a pair of parallel supporting members 6 composed preferably of I beams. Arranged transversely upon these I beams 6 are a pair of spaced channels or members 7 supporting at their ends a second pair of longitudinally disposed channels 8 arranged equidistant and parallel to the supporting I beams 6, from which longitudinal channels 8 are suspended four pairs of depending members 9 so as to form a rectangular cage or frame which normally rests upon the tongue extension 2 of the low bed truck 1 as disclosed in Figs. 1, 2 and 4 of the drawings, the purpose of which will hereinafter be more fully set forth.

At the lower ends of the depending members 9 and directly under and parallel to the transverse channels 7 we have provided pairs of angle irons 11 arranged to form a channel as disclosed in Fig. 4 of the drawings, within which formed channel rest a pair of bars 12 having bearings 14 formed in their outer ends.

A second set of longitudinally disposed and parallel channels 16 connect the lower ends of the members 9 on each side of the rectangular cage or frame so formed in order to impart further rigidity to the structure.

A centrally disposed transverse bar 17 is rigidly secured to the approximate center of the tongue extension 2 of the truck 1 and from the outer ends of said bar 17 we have suspended a pair of suitable springs 18 whose ends are in turn supported by suitable shackles 19 mounted within the bearings 14 of the parallel transverse bar 12 mounted within the channels or angles 11 in the lower ends of the four pairs of vertical members 9, which constitute a portion of the cage or frame hereinbefore described.

The tension of the springs 18 is such that when the tongue extension 2 is supported from the ground the frame or cage suspended from the longitudinal supports 6 rests upon said tongue extension 2.

When, however, the outer, front or free ends of the supporting bars 6 are placed upon a support and the tongue extension is otherwise unsupported, the load of the truck 1 will be resiliently suspended or supported through the medium of the cage and the springs 18 which are suspended from an intermediate point on said supporting bars 6, said supporting bars being pivotally or hingedly connected to the said truck as represented by the vertical members 4 thereon, and it is obvious that said cage or frame is free to move away from the tongue extension 2 of the truck 1 and thereby support the full load of said truck through the medium of said spring 18.

The supporting bars 6 are arranged in parallel and also in spaced relation relatively to each other in order that the free or front ends of said bars may bestraddle a lug 19 which is at present installed upon a saddle 20 which bridges the rear axle housing 21 of the rear axle 22 of a tractor 23 of the Fordson type, said tye of tractor 23 being provided with rear and front wheels 24 and 26 respectively.

This type of tractor is provided with a hauling clevis 27 arranged below and back of the rear axle 22 of the truck. Formerly an attempt was made to utilize the obsolete low bed trucks 1 by attaching the front end of the tongue extension 2 of said truck 1 directly onto said clevis 27. The result of this arrangement was that the load of the truck 1 had a tendency by reason of an excessive downward pressure on said clevis 27, to elevate the front wheels 26 of the tractor 23 especially when travelling over rough or bumpy roads, with the consequent detrimental effect upon the tractor 23.

This tendency to elevate the front wheels 26 from the ground was further enhanced by the acquired momentum of the load of the truck 1 when it was desired to stop the tractor by applying a braking pressure to the same, in which case the rear axle acted as a pivot and the forward push of the loaded truck 1 would generally result in elevating said front wheels.

With our present arrangement, however, the support of the load being directly over the rear axle 22 of the tractor 23, that portion of the weight of the load of the truck 1 which is transmitted through the supporting bars 6 is downward upon the rear or traction wheels 24 of the tractor 23 thereby increasing tractive effort of the said wheels 24.

The pull on the load is transmitted by means of a draw bar 31 pivotally connected to the front end of the tongue extension 2 and arranged for universal engagement with the clevis 27 of the tractor 22. No steering is done with this draw bar but by means of the spaced and parallel supporting bars 6 which straddle the lug 19 on the saddle 20 of the tractor 23 for it is obvious that as the tractor changes the direction of its course that said lug 19 will move the front ends of said bars 6 in the same direction and the truck 1 will trail along after it.

As the pull of the load is arranged below the rear axle 22 of the tractor 23 it is also obvious that the resistance due to inertia of the load of the truck 1 will tend to pull rearwardly on the clevis 27, which being below the rear axle 22 of the tractor 23, will tend to pull the front wheels 26 of the said tractor 23 downwardly and thereby tend to retain them on the ground instead of elevating them from the ground as hereinbefore set forth.

It is obvious from the foregoing that we have provided a new and improved trailer support for motor truck hauling wherein the heretofore obsolete and discarded low bed trucks may be practicably utilized with their former advantages and with a tractor of the Fordson type.

It is also obvious that we have provided a new and improved trailer support of the character set forth that is adapted to increase the tractive effort of the tractor and also to keep the front wheels upon the ground without the necessity of loading said wheels, thereby eliminating dead weight and reducing the cost of haulage.

Having thus described our invention, what we claim as new and desire to secure by Letters Patent is—

1. The combination with a tractor trailer and a four-wheeled tractor of a supporting bar pivotally connected at one end to said tractor trailer and arranged to rest upon said tractor at a point directly above the rear axle of said tractor whereby the pressure occasioned by the weight of said tractor trailer may tend to increase traction of the rear wheels of said tractor; and resilient spring connection connecting said bar intermediate the ends thereof with the front of said tractor trailer; and a draw bar pivotally connected with the front end of said tractor trailer and arranged for universal engagement with the tractor at a point below the rear axle thereof whereby the resistance occasioned by the load of said tractor trailer will tend to retain the front wheels of said tractor on the ground.

2. The combination with a four-wheeled tractor and a tractor trailer having a front tongue extension, of a supporting bar pivotally mounted upon the front end of said trailer at one end of said bar and having the other end thereof resting upon said tractor at a point directly over the rear axle of said trailer whereby the load of said trailer, through said bar, will exert a downward pressure upon the rear wheels of said tractor and thereby facilitate traction of said trailer; suitable springs mounted upon each side of said tongue extension of said trailer; and means connecting said springs with said bar to resiliently support the load of said trailer; and a suitable draw bar pivotally connected to the front end of said tongue extension of the trailer and arranged for universal engagement with the tractor at a point below the rear axle thereof whereby resistance of the load of said trailer will tend to retain the front wheels of said tractor upon the ground.

3. The combination with a tractor having front and rear wheels and a tractor trailer having a tongue extension on the front end thereof, of a pair of parallel supporting bars pivotally connected at one end to the said trailer at a point above the bed thereof and having the opposite ends of said bars arranged to rest upon said tractor at a point directly above the rear axle of said tractor whereby the pressure of the load of said trailer may tend to facilitate traction of said tractor; a semi-elliptical spring arranged upon each side of the tongue extension of the trailer; and a frame mounted intermediate the ends of the supporting bars and connected to the ends of the springs on each side of the tongue extension to resiliently suspend the load of the trailer from said supporting bars, said frame being arranged to be seated upon said tongue extension when the end of the supporting bars are free from the tractor; and a draw bar pivotally connected to the front end of the tongue extension and arranged for universal connection with the rear of the tractor at a point below the rear axle thereof whereby the resistance due to the load of the trailer may tend to retain the front wheels of the tractor on the ground.

In witness whereof we hereunto set our signatures.

JOHN E. HUGHES.
ANDREAS ANDRESEN.